3,263,413
SYSTEM FOR CONTROLLING A DIESEL ENGINE TO PROVIDE SAFE OPERATION IN AN EXPLOSIVE ATMOSPHERE
Benjamin H. Van Vactor, Ashland, Ky., assignor to National Mine Service Company, a corporation of West Virginia
Filed Aug. 10, 1965, Ser. No. 478,666
7 Claims. (Cl. 60—30)

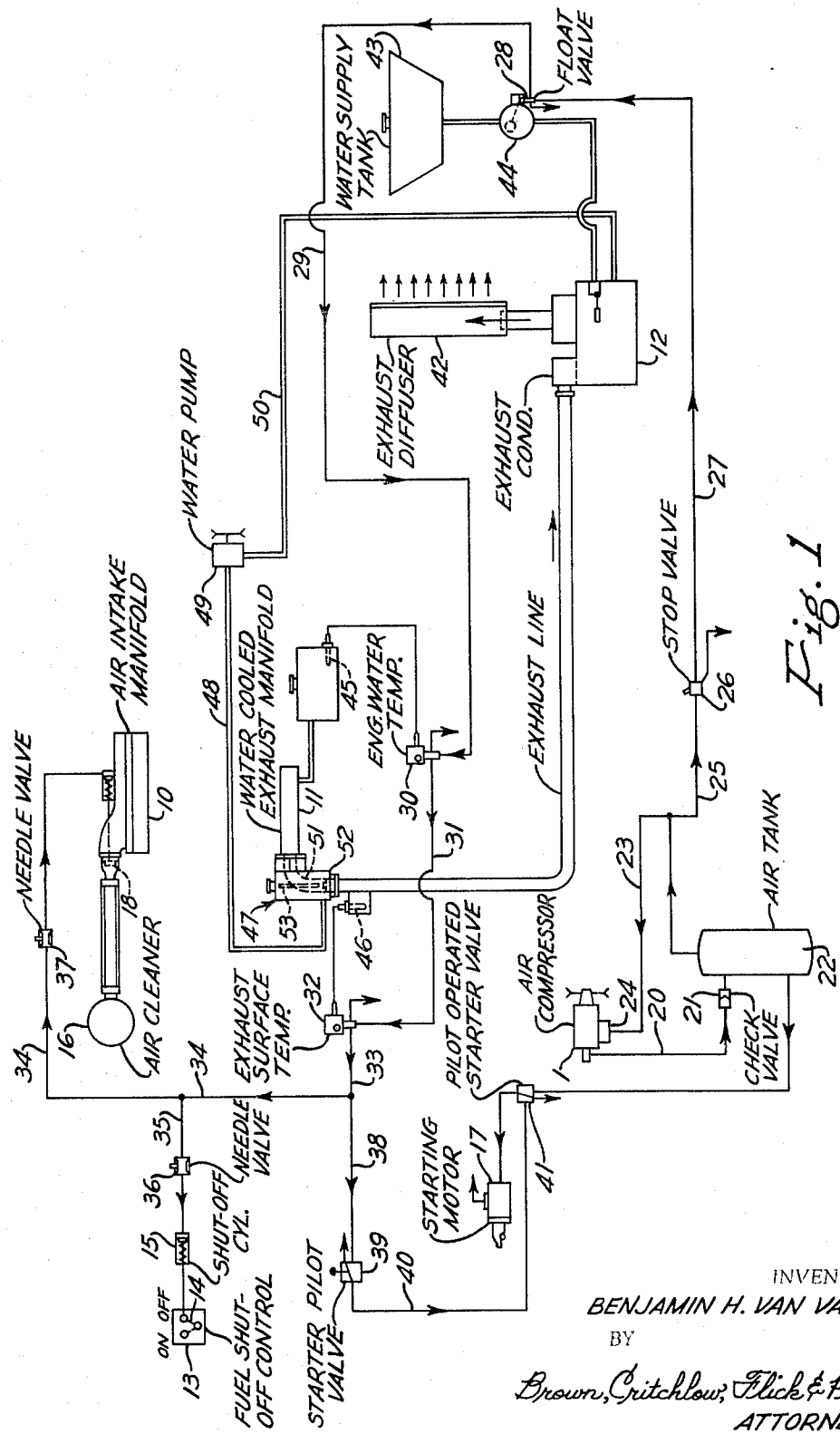

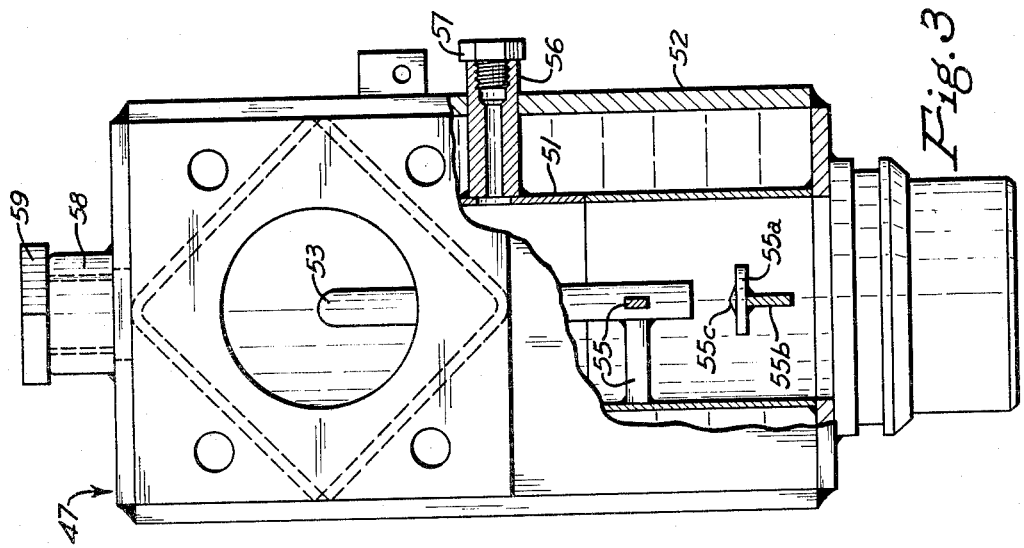
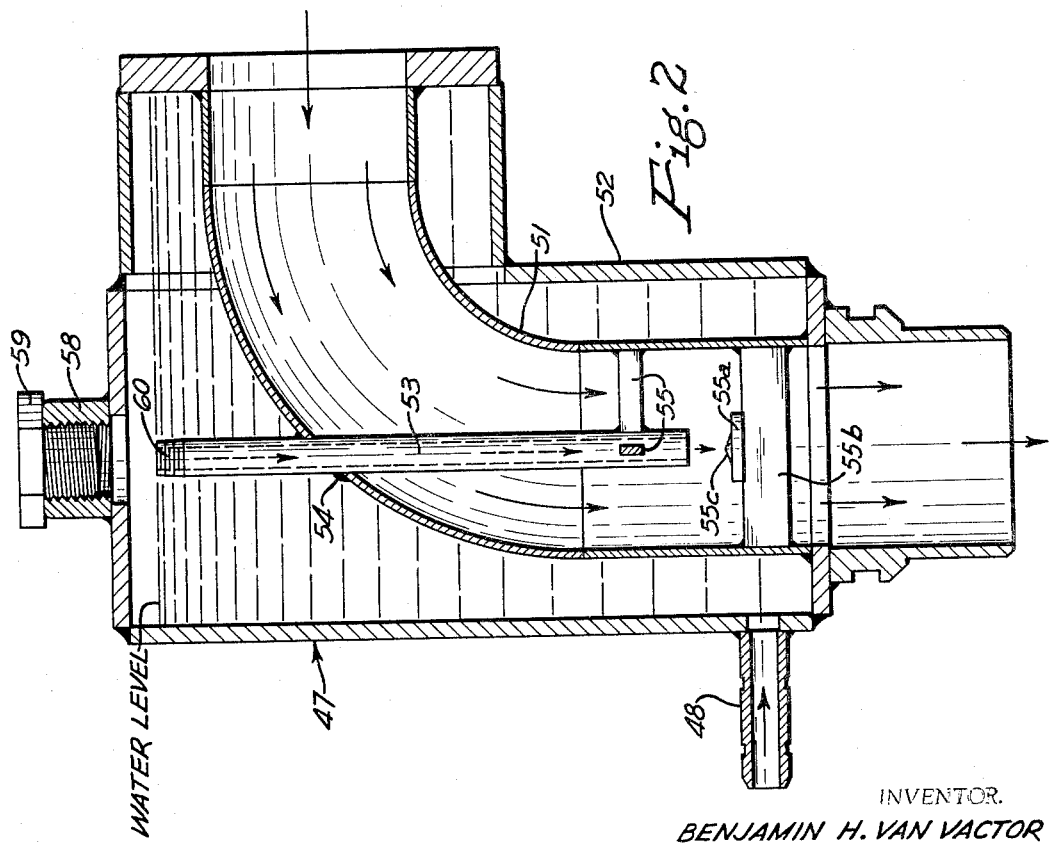

The present application is in part a continuation of my prior applications Serial No. 10,891 filed February 25, 1960, now abandoned; Serial No. 176,315, filed February 28, 1962, now abandoned; and Serial No. 295,906, filed July 18, 1963.

This invention relates to a system for controlling a diesel engine in such a manner as to provide for safe operation in an explosive atmosphere.

Up to the present there have been restrictions on the use of diesel engines in situations where an explosive atmosphere may exist, such as in some mines. These restrictions have been due to the fact that certain parts of the diesel engine may at times reach temperatures high enough to ignite the explosive atmosphere, and to the fact that sparks may be emitted from the exhaust.

The present invention provides a system with means arranged to keep the temperature of all engine parts below the danger point, and with means to cool the exhaust gases and stop all sparks and flame from leaving the exhaust discharge.

When the parts are in position to permit engine operation, the fuel control and the air intake valve for the engine are both held in the operative position by air pressure. Safety control devices are connected with valves in the air line, so that if any one of these safety devices is triggered by a dangerous condition, the air is exhausted from the air pressure line and the engine is stopped.

This safety system is operated entirely by air pressure, and no electricity is used in the system. Since the diesel engine requires no electrical components, this means that there is no danger from sparks coming from electrical components.

A water-cooled elbow with water injection and dispersion means surrounds a portion of the exhaust pipe and provides for keeping the exhaust pipe below the maximum temperature and for saturating the exhaust gas with water, thus reducing the temperature of the exhaust gas to 160° F.

These, and other objects and advantages of the invention will become apparent as the description proceeds.

In the drawings:

FIG. 1 is a diagrammatic representation of a system incorporating the invention;

FIG. 2 is an enlarged side elevation of the water injector and vaporizer used in the exhaust system;

FIG. 3 is an elevation, partly in section of the device of FIG. 2.

My prior Patent No. 2,687,008 discloses a safety system in which a valve, controlled hydraulically by fluid drawn from the sump in the exhaust gas conditioner, controls of the engine. If the fluid in the exhaust gas conditioner is below the "safe" level it is impossible to operate the engine.

My prior Patent No. 2,709,335 discloses a safety system which is electrically actuated, and which prevents operation of the engine unless two conditions are met, namely; (1) the fluid in the exhaust gas conditioner is at a safe level, (2) the temperature of the exhaust pipe is at a safe level.

The present invention is an improvement on this latter system in that it provides a system actuated by compressed air that makes it possible to eliminate all electrical circuits from the equipment. The safety advantages of eliminating all electrical circuits from engines operating in mines is so apparent as to require no further explanation.

In addition, a temperature control device is arranged so as to be responsive to excessive temperature in the engine cooling water, and is connected to a valve in the air line, so that when a predetermined temperature is exceeded, the pressure from the main air line is exhausted to stop the engine.

Further, a positive-displacement pump controlled solely by engine speed supplies water to a cooling elbow in the exhaust pipe to cool the exhaust pipe and pre-cool the exhaust gases as they issue from the exhaust manifold into the exhaust pipe.

The cooling elbow provides a pool of water surrounding the exhaust pipe which serves to maintain the surface of the exhaust pipe beyond the elbow below 400° F. The elbow also includes an internal injection pipe and a water dispersion disc that accomplishes immediate mixing of water and gas and assures complete saturation of the gas with water vapor, thus lowering the temperature of the gas to 160° F.

In general the system includes a diesel engine (not shown) having an air intake manifold 10, a water-cooled exhaust manifold 11, and an exhaust gas conditioner 12. This latter may be of any type in which a safe level of fluid must be maintained, but it is preferably of the type shown in my Patent No. 2,790,506.

The safety control system of the present invention will now be described in greater detail.

*Fuel and air controls*

The diesel engine is normally provided with a fuel pump 13 which has a fuel control 14. This control 14 may be in the "on" position, in which fuel is supplied to the engine, or in the "off" position, in which fuel is cut off from the engine.

According to the present invention, the fuel control 14 is connected to the piston of shut-off cylinder 15, which piston is spring-pressed toward the right-hand, or "off" position, and is moved to the left-hand, or "on" position, by air pressure admitted to the right-hand end of the cylinder.

Air for combustion enters through the air cleaner 16 and then passes to the air intake manifold 10. Passage of air from the air cleaner 16 to intake manifold 10 is controlled by a poppet valve 18. The poppet valve 18 is connected to the piston of shut-off cylinder 19, which piston is spring-biased toward the right-hand or "closed" position, and is moved to the left-hand, or "open" position, by air pressure admitted to the right-hand end of the cylinder.

It will be clear from the above description that the presence of air pressure in the right-hand end of the cylinder 15 moves the fuel control 14 to the "on" position, and that the presence of air pressure in the right-hand end of the cylinder 19 moves the air intake valve 18 to its "open" position. Thus the air-pressure system supplies pressure to permit both fuel and air to pass to the engine. The manner in which air pressure is provided for the cylinders 15 and 19 will now be explained.

*Air supply for cylinders 15 and 19*

The air compressor 1 which is driven by the diesel engine supplies air by way of conduit 20 through check valve 21 to tank 22. From tank 22 air pressure returns by conduit 23 to the governor 24 which controls operation of the air compressor in a well-known manner.

Pressure from the air tank is supplied to the control cylinders 15 and 19 as follows:

(a) Pressure flows through conduit 25, through the stop valve 26 thence by conduit 27 to the float-controlled valve 28.

(b) Air pressure passing through the float-controlled valve 28 passes by way of conduit 29 to valve 30 which is controlled by engine temperature.

(c) Air pressure passing through vlave 30 is carried by conduit 31 to valve 32 which is controlled by surface temperature of the exhaust pipe.

(d) Air pressure passing through valve 32 is carried by conduits 33, 34 and 35 through needle valve 36 to the operating cylinder 15.

(e) A continuation of conduit 34 conducts the air through the needle valve 37 to operating cylinder 19.

It will be clear that when all the valves specified in paragraphs (a) to (c) are in open position, air pressure from tank 22 is admitted to the right-hand end of operating cylinders 15 and 19 thereby holding the fuel control 14 in the "on" position and the air intake valve 18 in the "open" position.

Starting and stopping

A conduit 38 which is a continuation of conduit 33 conducts air pressure to the starter pilot valve 39 and air passing through the starter pilot valve is carried by conduit 40 to the pilot operated starter valve 41.

When the fuel control 14 is in the "on" position and the air intake valve 18 is in the "open" position, a pressure on the starter pilot valve 39 admits air pressure to the pilot operated starter valve 41 which thereupon admits pressure directly from the air tank 22 to the starting motor 17 which turns over and starts the diesel engine.

When the engine is to be stopped, the stop valve 26 is moved manually to the "stop" position to shut off flow of air pressure through the main air line 27, and to exhaust the air pressure from that line.

Fail safe operations

In case any of the valves enumerated in paragraphs (a) to (c) above close due to unsafe conditions, the engine is stopped and cannot be operated until the unsafe condition has been cured. The operation of these valves will now be explained individually.

Float-operated valve 28

This valve closes in case there is a deficiency in the supply of water to the exhaust gas conditioner 12.

As explained previously the exhaust gas conditioner 12 is preferably of the type shown in my patent 2,790,506. This type of conditioner insures that all of the exhaust gases pass through a water bath which extinguishes sparks and flame, and also insures that the gases passing out from the exhaust gas conditioner through the diffuser 42 are free of aldehydes (odor) and carbon, and are completely saturated with water vapor, which means that they are at a temperature of 160° F.

Water is supplied to the exhaust gas conditioner 12 from the water supply tank 43 and float chamber 44. If the water supply tank should become empty, the float in chamber 44 will drop, thus closing the float-operated valve 28, and causing air pressure to bleed from the main air line. This removal of pressure from the main air line will permit the operating cylinders 15 and 19 to move to the left under spring pressure, thus cutting off both fuel and air and stopping the engine.

Sequence of closing air and fuel valves in stopping operations

The needle valves 36 and 37 slow down operation of the cylinders 15 and 19, and prevent slamming of the pistons. The needle valves 36 and 37 are so adjusted that valve 36 has a larger opening than valve 37, and therefore the cylinder 15 will move the fuel-control 14 to closed position before the air-intake valve 18 is closed. Thus the engine rotation is stopped (by cutting off the fuel supply) before the intake air valve is closed. This prevents the possibility of creating a partial vacuum and pulling lubricating oil into the combustion chambers which would cause excessive smoke in the exhaust when the engine is started again.

Valve 30, controlled by engine water temperature control

Valve 30 is controlled by temperature bulb 45 placed in the engine cooling water. These parts are so arranged that if the temperature of the engine cooling water rises above 212° F., valve 30 closes the main air line, and exhausts air pressure from conduit 31 which extends beyond the valve 30. The closing of valve 30 will shut down the engine in the manner previously described and the engine cannot be started again until the temperature of the engine cooling water has dropped sufficiently that the valve 30 can be opened.

Valve 32, controlled by surface temperature of exhaust pipe

The valve 32 is controlled by a temperature bulb 46 placed in contact with the surface of the exhaust pipe.

The surface temperature of the exhaust pipe is maintained well below the maximum allowable of 400° F. by the water vaporizing chamber 47 which will be presently described in detail. This vaporizing chamber 47 substantially saturates the exhaust gases with water vapor and since saturated gas is at a temperature of 160° F. this means that the surface temperature of the exhaust pipe is at 160° F. or less.

The bulb 46 is set for a slightly higher temperature, such as 170° F., and when the bulb exceeds this temperature, valve 32 closes to cut off the main air line. At the same time air is exhausted from the conduit 33 thereby removing air pressure from the cylinders 15 and 19 and causing the engine to stop in the manner previously described.

Water-vaporizing chamber 47

The water-vaporizing chamber 47 (see FIGS. 2 and 3) is connected by conduit 48 to an engine-driven water pump 49. This pump is driven at a speed which varies directly with the speed of the engine, and since pump 49 is of the positive displacement type, the volume of water delivered by conduit 48 to the water-vaporizing chamber 47 varies directly with the speed of the engine.

Pump 49 draws its supply by conduit 50 from the exhaust gas conditioner 12, and is connected to the conditioner at a point below the float valve, where it receives relatively clean water from the quiet pool surrounding the float valve.

The pump 49 is of a capacity well in excess of the minimum volume required under maximum engine load to maintain the temperature of the exhaust line below the allowable temperature of 400° F. The parts are so constructed that the excess that is not vaporized in chamber 47 flows by way of the exhaust line back to the conditioner 12. In this way an excess of cooling capacity is provided without wasting any water. This is an important factor in mining operations underground.

As shown in FIGS. 2 and 3, the water-vaporizing chamber 47 includes an inner elbow 51 through which the exhaust gases flow, and an outer, water-tight jacket 52. A water injection tube 53 extends through the upper wall of the elbow 51, and is fixed in position with its lower end on the central axis of the discharge end of elbow 51. The upper end of tube 53 extends to near the top of the jacket 52.

Injection tube 53 has a sealed joint with inner elbow 51, and is welded at 54 to the elbow. Struts 55 hold the lower end of the water tube 53 positioned on the central axis of the discharge end of the elbow 51.

A dispersion disc 55a is held in a position centered within elbow 51 and spaced a short distance from the lower end of water injection tube 53. The disc is mounted on bracket 55b and has a conical upward projection 55c which acts to disperse the water outwardly.

In operation water enters the lower end of jacket 52 by way of conduit 48 and passes upwardly over the exhaust elbow until it forms a level at the top of the tube 53. The water then flows downwardly through tube 53 and is delivered in the center of the stream of hot exhaust gas passing downwardly through the elbow.

The dispersion disc 55a breaks up and disperses the stream of water flowing from tube 53 and directs it outwardly to form a uniform film of water extending across the entire internal area of the exhaust pipe. As the hot gases pass through this film there is an immediate and complete mixing of gas and water that causes a thorough saturation of the gas with water vapor. It is well known that such saturation reduces the temperature of the gas to 160° F.

In case the engine speed is increased, the speed of pump 49 increases proportionally, so that an increased volume of water is supplied to the water-vaporizing chamber 47 to handle the increase of hot gases.

After leaving the water-vaporizing chamber 47 the exhaust gas passes through the exhaust line to the exhaust gas conditioner 12, which also acts to saturate the gas with water vapor. Hence, if for any unusual reason the gas is not completely saturated with water vapor in the water-vaporizing chamber 47, the process will be completed in the exhaust gas conditioner 12 before the gas is exhausted through the exhaust diffuser 42.

The water-vaporizing chamber 47 is preferably in the form of a 90° elbow, receiving the exhaust gas from the horizontal exhaust manifold and delivering it to a vertical run of the exhaust line, the parts being in these positions when the diesel locomotive or mine car is in a horizontal position.

The chamber between the outer shell of the elbow and the inner elbow 51 forms a body of water completely surrounding the elbow for a considerable distance so that the surface of the exhaust line after it emerges from the water-vaporizing chamber 47 is always kept well below the safe temperature of 400° F.

Since the lower end of the injection tube 53 is well below the normal level of the exhaust manifold 11, it is practically impossible in any position of the engine, for water from tube 53 to run into the exhaust manifold.

The water injection tube 53 is preferably a stainless steel tube having an inside diameter of ¼ inch. This provides a simple and reliable injection tube that does not become clogged, as would a spray nozzle with the use of contaminated water from the exhaust gas conditioner. This is an important feature, since it eliminates a possible source of down-time for servicing the engine.

The water-vaporizing chamber thus constructed permits pumping, by means of a positive displacement pump running at a speed corresponding with the engine speed, an excess of water above normal requirements at all engine speeds. The excess water merely flows in the form of water or water vapor back to the exhaust gas conditioner. Thus, the construction avoids the need for accurate flow control or metering devices, and provides a simple and rugged device.

A sampling connection 56 provided with a threaded plug 57 extends through the water chamber and connects with the inner exhaust elbow 51.

The upper surface of the water-vaporizing chamber 47 is provided with a coupling stud 58 normally closed by plug 59. By removing the plug 59 the chamber may be pressure-tested, and by attaching a fitting to the threaded end 60 of the injection tube further pressure-testing may be done.

*System is explosion proof*

The present invention provides an explosion-proof system in which a certain amount of back pressure exists on the exhaust system while the engine is in operation. If, for example, an accumulation of methane should cause an explosion between the engine and the exhaust conditioner 12, the flame could not pass through the body of water in the sump of the conditioner 12. Neither could it pass to the atmosphere in the other direction, because after passing upward through the water tube 53 it would be extinguished by the pool of water in the jacket 52.

*Conclusion*

The present invention provides a system which completely flame-proofs and spark-proofs the diesel engine. In addition all parts of the engine which might attain temperatures in excess of those considered to be safe, are automatically monitored so that any excessive temperature or failure of safety devices will immediately stop the engine.

Specifically the system performs the following functions:

(1) Prevents operation of the engine if the temperature of the cooling water reaches 212° F.
(2) Maintains all surface temperatures at a value below 400° F.
(3) Cools the exhaust gases to 170° F. or less.
(4) Absorbs aldehydes (odor) and any carbon that may be present in the exhaust.
(5) Eliminates the possibility of the exhaust gases causing ignition of a gaseous atmosphere outside of the exhaust system.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. In a safety control system for a diesel engine of the type having the following known features:
    (a) an air intake manifold controlled by an air inlet valve;
    (b) a fuel control;
    (c) a water jacketing system;
    (d) an exhaust gas conditioner which contains a pool of water;
    (e) an exhaust system that comprises a water-cooled exhaust manifold and an exhaust pipe that carries exhaust gases from the exhaust manifold to the exhaust gas conditioner;
the improvement that comprises the combination of elements designated as Elements A to F inclusive and defined as follows:
    Element A, an air control cylinder having a piston connected to the air inlet valve, and movable by air pressure from a "closed" to an "open" position;
    Element B, a fuel control cylinder having a piston connected to the fuel control, and movable by air pressure from an "off" to an "on" position;
    Element C, an air tank which contains air under pressure;
    Element D, a main air line which carries air from the air tank, Element C, to the control cylinders specified in Elements A and B to move the air inlet valve to the "open" position and the fuel control to the "on" position, provided the following conditions exist concerning control valves located in the main air line:
        (1) A float valve is held open by proper supply of water to the exhaust gas conditioner;
        (2) A valve is in open condition, but which closes when the engine cooling water exceeds 212° F.;
        (3) Valves in the air lines which carry air to the control cylinders specified in Elements A and B, said valves being set so that when air is bled from the main air line the fuel control is moved to the "off" position before the air inlet valve is moved to the "closed" position;
    Element E, a water vaporizing chamber connected between the exhaust manifold and the exhaust pipe, and arranged to cool the exhaust gases and to substantially saturate them with water vapor; and Element F, a water pump controlling flow of water to the vaporizing chamber according to the speed of the engine.

2. A system as specified in claim 1 in which the control cylinders, Elements A and B, are spring-biased to off positions.

3. A system as specified in claim 1 in which the water vaporizing chamber is provided with a tube which delivers water to the exhaust gases.

4. In a diesel engine exhaust system of the type which includes a water-cooled exhaust manifold which normally is disposed in a horizontal position, and an exhaust pipe which normally is disposed in a vertical position, the improvement which comprises:

a 90° elbow connecting the exhaust manifold to the exhaust pipe;
a closed water jacket surrounding the elbow throughout its entire length;
a water inlet pipe connected to the lower part of the water jacket;
a water injection tube extending through the upper wall of the elbow;
the water injection tube having a uniform inner diameter and having its upper end extending to a point near the upper part of the water jacket, and its lower end extending to a point near the lower end of the elbow;
the water injection tube being located on the axis of the exhaust pipe;
and a dispersion disc mounted on the axis of the exhaust pipe and spaced a short distance from the outlet end of the injection tube;
whereby a pool of water surrounds the entire length of the elbow;
and water issuing from the lower end of the injection tube is dispersed to mix with the exhaust gas passing through the elbow.

5. A device as specified in claim 4 in which a positive displacement pump is connected to supply water to the water discharge tube, the pump being driven at speeds proportional to the speed of the diesel engine.

6. In a safety control system for a diesel engine of the type having the following known features:
(a) a water-cooled exhaust manifold;
(b) an exhaust gas conditioner containing a level of water in a sump;
(c) an exhaust line carrying exhaust gases from the manifold to the conditioner;

the improvement that comprises the combination of elements designated as Elements G to K inclusive and defined as follows:

Element G, an exhaust elbow carrying the exhaust gases from the manifold to the exhaust line;
Element H, a closed water jacket surrounding the elbow;
Element I, a water conduit connected to the exhaust gas conditioner (b) and to the closed water jacket (H);
Element J, a water pump in the water conduit (I); and
Element K, a water tube disposed in the exhaust elbow (G) with its upper end extending through the wall of the elbow by way of a water-tight joint and projecting into the closed water jacket (H) and with its lower end disposed on the center line of the discharge end of the elbow, and extending to a point below the level of the water-cooled exhaust manifold (a).

7. A device as specified in claim 6 in which the water pump is driven at a speed proportional to the speed of the diesel engine.

References Cited by the Examiner
UNITED STATES PATENTS

| | | | |
|---|---|---|---|
| 1,131,862 | 3/1915 | Perkins | 60—31 X |
| 2,708,824 | 5/1955 | Engstrom | 60—30 |
| 2,757,650 | 8/1956 | Holley. | |
| 2,709,335 | 5/1955 | Van Vactor | 60—30 |

EDGAR W. GEOGHEGAN, *Primary Examiner.*

MARK NEWMAN, *Examiner.*

R. D. BLAKESLEE, *Assistant Examiner.*